(12) United States Patent
Chen

(10) Patent No.: US 6,921,235 B2
(45) Date of Patent: Jul. 26, 2005

(54) LASER CENTERING MECHANISM OF A DRILLING MACHINE

(75) Inventor: Sean Chen, Taipei (TW)

(73) Assignee: Sean & Stephen Corp., Taipei (TW)

( * ) Notice: Subject to any disclaimer, the term of this patent is extended or adjusted under 35 U.S.C. 154(b) by 376 days.

(21) Appl. No.: 10/340,803

(22) Filed: Jan. 13, 2003

(65) Prior Publication Data

US 2004/0136796 A1 Jul. 15, 2004

(51) Int. Cl.⁷ ............................................. B23B 49/00
(52) U.S. Cl. ........................... 408/16; 408/13; 362/253; 362/259
(58) Field of Search .................... 408/13, 16; 362/253, 362/259, 109, 119; 356/399; 33/286, 333, 334, DIG. 21, 638; 279/126, 133, 142, 158

(56) References Cited

U.S. PATENT DOCUMENTS

| | | | | |
|---|---|---|---|---|
| 4,887,193 A | * | 12/1989 | Dieckmann | 362/89 |
| 5,148,232 A | * | 9/1992 | Duey et al. | 356/141.3 |
| 5,522,683 A | * | 6/1996 | Kakimoto et al. | 408/13 |
| 5,741,096 A | * | 4/1998 | Olds | 408/1 R |
| 6,301,997 B1 | * | 10/2001 | Welte | 81/54 |
| 6,328,505 B1 | * | 12/2001 | Gibble | 408/16 |
| 6,413,022 B1 | * | 7/2002 | Sarh | 408/76 |
| 6,587,184 B2 | * | 7/2003 | Wursch et al. | 356/4.01 |
| 6,692,200 B2 | * | 2/2004 | Peterson | 408/1 R |
| 2004/0032587 A1 | * | 2/2004 | Garcia et al. | 356/399 |
| 2004/0093749 A1 | * | 5/2004 | Wu | 33/286 |

FOREIGN PATENT DOCUMENTS

JP          55125954 A   *   9/1980   ........... B23P/23/04

* cited by examiner

Primary Examiner—Derris H. Banks
Assistant Examiner—J Williams
(74) Attorney, Agent, or Firm—Rosenberg, Klein & Lee

(57) ABSTRACT

A laser centering mechanism of a drilling machine includes a clamp ring fitted around a drill chunk of a drilling machine, upper and lower knobs, and two laser modules. The clamp ring has several spaced upwards-sticking flexible plates, and several downwards-sticking flexible plates. The knobs are fitted around an upper end, and a lower end of the clamp ring respectively. The knobs are securely screwed to each other so that inner annular portions thereof make corresponding flexible plates tightly and securely pressed against the drill chunk. The laser modules are fixed to an inner edge of the lower knob, and are equipped with such lenses that laser lights emitted therefrom form intersecting straight light lines on a plane under them, which will form a centering light point on a central axis of the lower knob in rotation of the present mechanism together with the drill chunk.

4 Claims, 5 Drawing Sheets

LASER CENTERING MECHANISM OF A DRILLING MACHINE

BACKGROUND OF THE INVENTION

1. Field of the Invention

The present invention relates to a laser centering mechanism of a drilling machine, more particularly one, which is secured to a drill chunk of a drilling machine, and which consists of two laser modules capable of emitting laser lights forming two intersecting lines on a workpiece for helping a drill of the drilling machine to be centered on a predetermined point of the workpiece, on which a hole is to be drilled; only the intersection of the perpendicularly intersecting lines can be seen when the drill is rotating due to persistence of vision.

2. Brief Description of the Prior Art

Referring to FIG. 1, a conventional drilling machine has a support base 11, a support rod 12 joined to the base 11, and a table 13 supported on the support rod 12 for a workpiece 10 to be positioned on; fixing jaws 19 are disposed on the table 12 for fixing the workpiece 10 in position; a power source 14 is disposed above the table 12, and has a support tube 17, and a transmission shaft (not shown), which sticks downwards within the support tube 17, and to which a drill chunk 15, and a drill 16 are connected. A control member 18 is joined to the support tube 17 so that the support tube 17 can be moved down for the drill 16 to drill holes on the workpiece 10 by means of operating the control member 18.

In order for the drill 16 to drill a hole on a workpiece at a predetermined position, the workpiece is usually first formed with a shallow mark at the predetermined point to be drilled by means of a centering punch before it is fixed on the table 13 with the jaws 19. A shallow hole can be first drilled at the predetermined point of a workpiece with a centering drill instead before the drill 16 is used to drill a hole on the workpiece.

Both of the above ways is not very convenient to use because the operator has to watch carefully to establish whether the drill is centered on the shallow mark while he is operating the control member 18 to move the drill onto the workpiece, causing labor and time to increase in manufacturing. Consequently, the cost of production is relatively high.

SUMMARY OF THE INVENTION

It is a main object of the present invention to provide a laser centering mechanism to a drilling machine, which consists of two laser modules capable of emitting laser lights forming two intersecting light lines on a workpiece for helping the drill of the drilling machine to be centered on a predtermined point of a workpiece, on which a hole is to be drilled, and which is fitted around a drill chunk so that only a light point at the intersection of the light lines is left visible when the drill is rotating.

The laser centering mechanism includes a clamp ring fitted around a drill chunk, upper and lower knobs, and two laser modules. The clamp ring has several spaced upwards-sticking flexible plates, and several downwards-sticking flexible plates. The knobs are fitted around an upper end, and a lower end of the clamp ring respectively, and securely screwed to each other to press corresponding flexible plates tightly against the drill chunk. The laser modules are fixed to an inner edge of the lower knob, and are equipped with such lenses that laser lights emitted therefrom will form intersecting straight light lines on a plane under them, of which the intersection is right on a central axis of the drill. Therefore, a single laser light point at the intersection is left visible for helping the drill to be centered on a marked point of a workpiece when the drill is rotating, and causes the present mechanism to rotate together with it.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
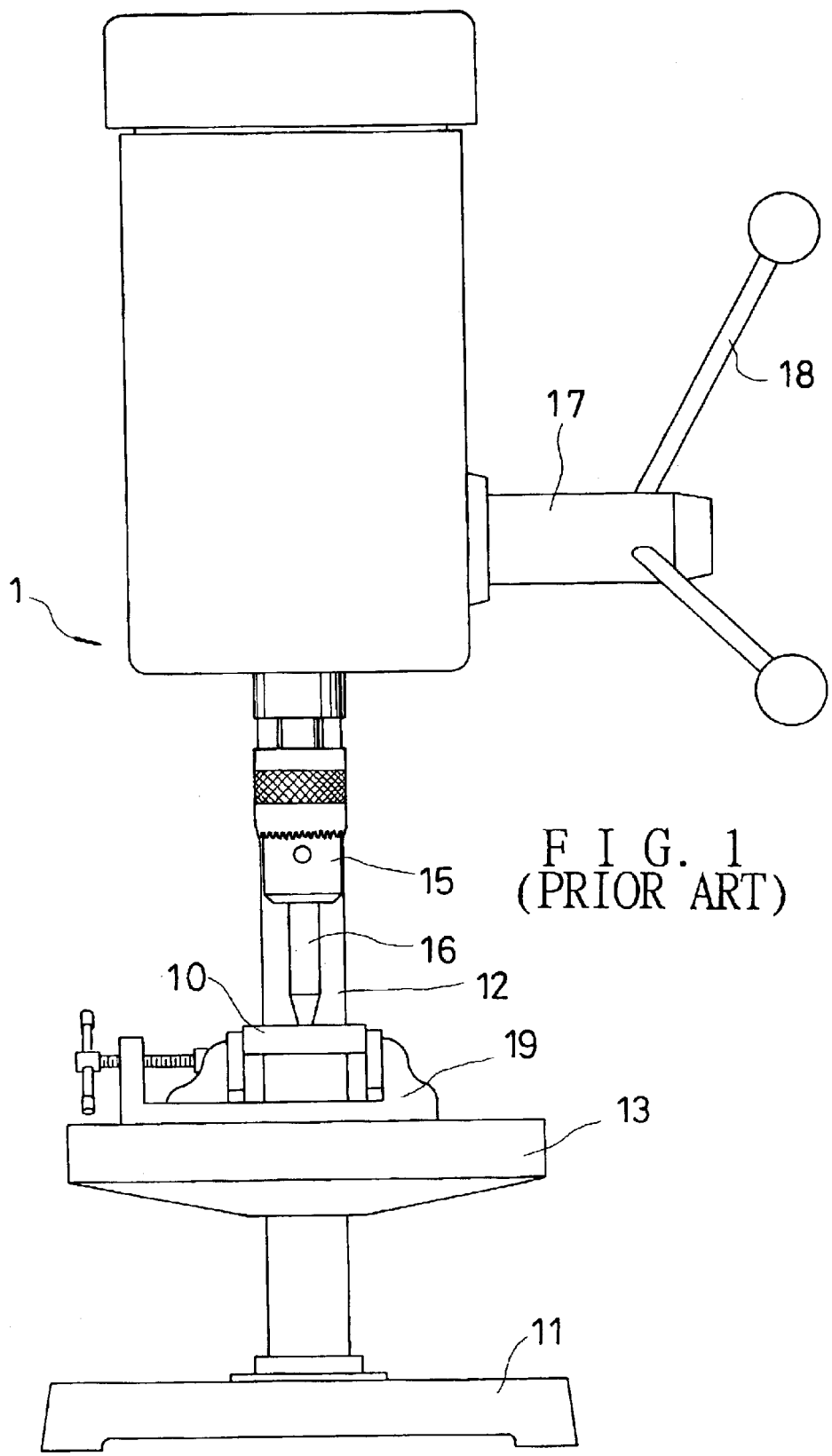
FIG. 1 is a front view of a conventional drilling machine as described in the Background.
Figure 2:
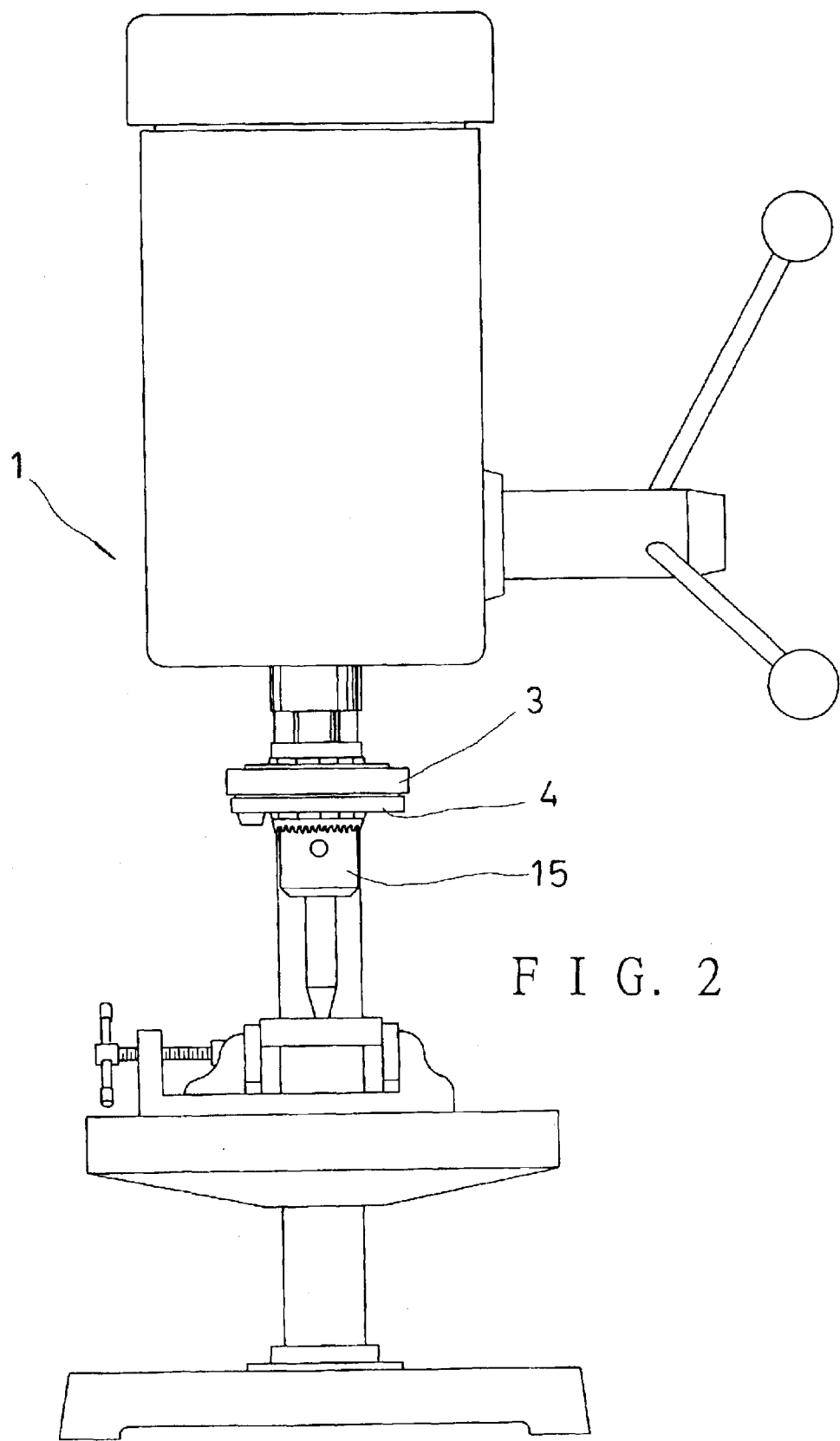
FIG. 2 is a front view of the drilling machine equipped with laser centering mechanism the according to the present invention.
Figure 3:
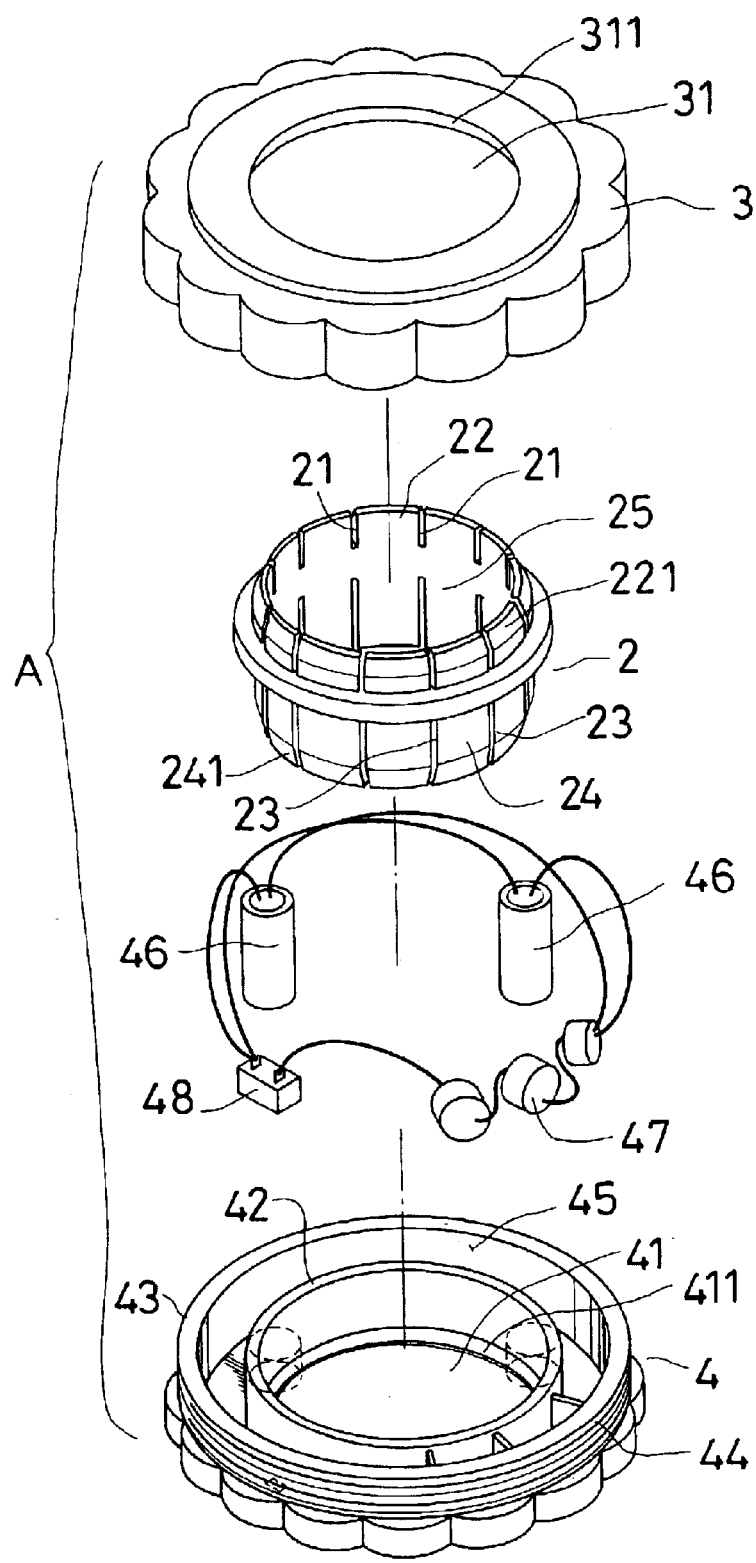
FIG. 3 is an exploded perspective view of the laser centering mechanism of a drilling machine according to the present invention.

Referring to FIGS. 2, and 3, a laser centering mechanism (A) of a drilling machine according to the present invention includes a clamp ring 2 to be securely fitted around a drill chunk 15 of a drilling machine, two laser modules 46, 46, an upper knob 3, and a lower knob 4.

The clamp ring 2 has a through hole 25 defined by a middle portion (not numbered), several spaced upper flexible plates 22 extending from the upper side of the middle portion, and several spaced lower flexible plates 24 extending from the lower side of the middle portion; gaps 21 are provided between the flexible plates 22; gaps 23 are provided between the flexible plates 24. The upper flexible plates 22 each tapers from a middle towards an upper end thereof to have a sloping surface 221 on an outer side of an upper end portion thereof, and the flexible plates 24 each tapers from a middle towards a lower end thereof to have a sloping surface 241 on an outer side of a lower end portion thereof.

The upper knob 3 has a through hole 31, an annular sloping portion 311 around the through hole 31, and left-handed screw threads 33 on an inner side thereof (FIG. 5); the annular sloping portion 311 slopes like an annular middle section of a standing cone for fitting the sloping surfaces 221 of the clamp ring 2, i.e. an upper end of the annular sloping portion 311 has a smaller diameter than a lower end.

The lower knob 4 has a through hole 41 defined by an inner annular wall 42, an outer annular wall 43, a ring-shaped space 45 defined by the annular walls 42 and 43, an annular sloping portion 411 around the through hole 41 on a lower end portion of the inner annular wall 42, and left-handed screw threads 44 on an outer side of the outer annular wall 43; the annular sloping portion 411 slopes like an annular middle section of an upside-down cone for fitting the sloping surfaces 241 of the clamp ring 2, i.e. an upper end of the annular sloping portion 411 has a bigger diameter than a lower end.

The laser modules 46, 46 are connected to a power source 47, and a switch 48, and are fixedly disposed in the ring-shaped space 45 of the lower knob 4; holes (not numbered) are formed on the bottom of the lower knob 4 so that laser lights emitted from the laser modules 46, 46 are allowed to travel to under the knob 4. Each of the laser modules 46, 46 has a lens (not shown) fitted thereto, which can make laser light emitted from the laser module form a straight light line on a plane surface under it. Lenses to be fitted to the laser modules 46, 46 can be wave-shaped, cylindrical, or lozenge. The laser modules are not the subject of the present invention therefore they will not be detailed herein. And, the laser modules 46, 46 are positioned such that the straight light lines formed on a surface by the laser lights intersect each other to form a light point exactly on a central axis of the lower knob 4.

Figure 4:
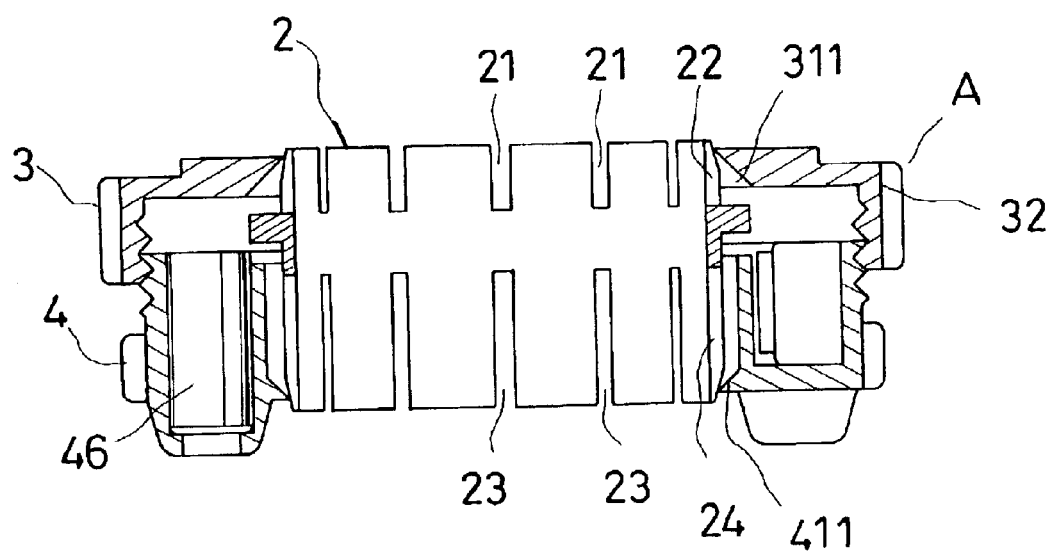
FIG. 4 is a side view of the laser centering mechanism of the present invention; and, FIG. 5 is a cross-sectional view of the laser centering mechanism of the present invention, fitted to a drilling machine.

Referring to FIG. 4, when the clamp ring 2 is disposed in the through hole 41 of the lower knob 4, and the lower knob 4 is screwed into the upper knob 3, the annular sloping portions 311, 411 will be pressed against corresponding sloping surfaces 221, 241 of the flexible plates 22, 24 to force the flexible plates 22, 24 to bend inwardly of the clamp ring 2; due to the annular sloping portions 311, 411, the more tightly the lower knob 4 is screwed to the upper knob 3, the more inwardly of the clamp ring 2 will the flexible plates 22, 24 bend.

Figure 5:
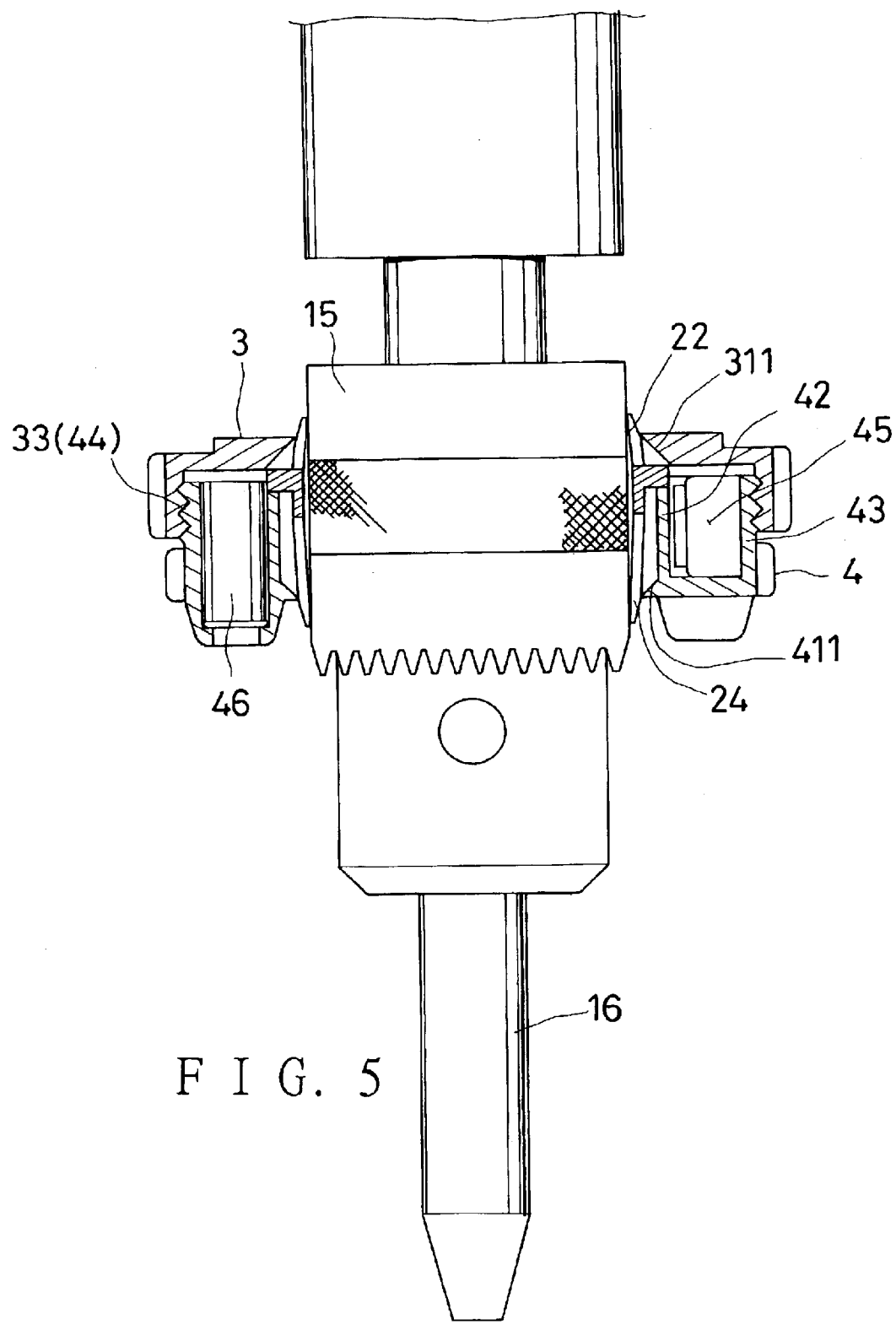

Referring to FIG. 5, to join the present laser centering mechanism to a drilling press or an electric handy drill, the upper knob 3, the clamp ring 2, and the lower knob 4 are passed around a drill chunk 15 in sequence, and the lower knob 4 is screwed to the upper knob 3 so that the flexible plates 22, and 24 are tightly pressed against the chunk 15 by the corresponding annular sloping portions 311, and 411; thus, the laser centering mechanism is securely fixed to the chunk 15, and when the laser modules 46, 46 are activated, the intersection of the straight light lines formed on a plane by the laser lights of the modules 46, 46 will be exactly on an axis of the drill.

As has been mentioned above, when the switch 48 is opened, the laser lights will intersect to form a centering intersection on a workpiece. Therefore, the operator can adjust the orientation of a workpiece relative to a drill 16 so that a marked predetermined point of the workpiece, on which a hole is to be drilled, faces the intersection of the laser lights; when the drill 16 is rotating, only a light point is left visible on the workpiece, which is located at the intersection of the light lines, owing to persistence of vision.

Thus, when the drilling machine is used, the intersection of laser light lines helps the drill to be easily centered on a marked predetermined point of a workpiece precisely.

Because the drill 16 rotates clockwise, and because the upper and the lower knobs 3, and 4 are screwed to each other by means of left-handed threads 33, 43, the upper and the lower knobs 3, and 4 can't possibly become loose, and will only be screwed to each other even more securely when the chunk 15 and the drill 16 are rotating. In other words, the laser centering mechanism is securely joined to the chunk 15.

From the above description, it can be easily understood that the laser centering mechanism of the present invention has advantages as followings:

1. Because the laser centering mechanism can emit laser lights forming two intersecting light lines on a plane, and because only a light point is left visible at the intersection the drill is rotating owing to persistence of vision, the drill can be easily centered on a marked predetermined point of a workpiece by means of positioning the laser light point over the marked point of the workpiece. Therefore, the operator doesn't have to use centering punches or centering drills to make a shallow hole on the predetermined point of the workpiece, on which a hole to be drilled, and a lot of labor and time are saved.
2. Manufacturing cost is reduced, and the products are more competitive owing to reduction of time and labor in the drilling process.
3. The laser centering mechanism can be securely and easily fitted around the drill chunk of a drill press as well as that of an electric handy drill by means of screwing the upper and the lower knobs together.

What is claimed is:

1. A laser centering mechanism of a drilling machine, comprising a clamp ring fitted around a drill chunk of a drilling machine; the clamp ring having a through hole, a plurality of spaced upper flexible plates sticking upwards, and a plurality of spaced lower flexible plates sticking downwards; each of the upper flexible plates tapering towards an upper end thereof to have a sloping surface on an outer side thereof; each of the lower flexible plates tapering towards a lower end thereof to have a sloping surface on an outer side thereof;

an upper knob having a central through hole, and fitted around an upper portion of the clamp ring; the upper knob having an annular sloping portion fitting, and pressed against, the sloping surfaces of the upper flexible plates; the upper knob having left-handed screw threads on an inner side thereof;

a lower knob having a central through hole, and fitted around a lower portion of the clamp ring; the lower knob having an annular sloping portion fitting, and pressed against, the sloping surfaces of the lower flexible plates; the lower knob having left-handed screw threads on an inner side thereof; the upper and the lower knobs being securely screwed to each other so that the annular sloping portions thereof make corresponding flexible plates pressed against the drill chunk to fit the clamp ring around the drill chunk securely;

first and second laser modules fixedly disposed adjacent to an inner edge of the lower knob; the laser modules being equipped with such lenses that laser lights emitted therefrom form respective straight light lines on a plane under them; the straight light lines intersecting each other right on a central axis of the drill chunk, and having a light point left visible at the intersection thereof in rotation of the lower knob together with the drill chunk owing to persistence of vision.

2. The laser centering mechanism of a drilling machine as claimed in claim 1, wherein the lenses of the laser modules are wave-shaped.

3. The laser centering mechanism of a drilling machine as claimed in claim 1, wherein the lenses of the laser modules are cylindrical.

4. The laser centering mechanism of a drilling machine as claimed in claim 1, wherein the lenses of the laser modules are lozenge.

* * * * *